United States Patent [19]
Turner

[11] 3,757,394
[45]* Sept. 11, 1973

[54] HOSE CLIPS

[75] Inventor: David Lilley Turner, Coventry, England

[73] Assignee: National Research Development Corporation, London, England

[ * ] Notice: The portion of the term of this patent subsequent to Sept. 19, 1988, has been disclaimed.

[22] Filed: Dec. 9, 1970

[21] Appl. No.: 96,478

[30] Foreign Application Priority Data
Dec. 10, 1969 Great Britain.................. 60,202/69

[52] U.S. Cl. ................................ 24/281, 24/274 R
[51] Int. Cl. .......................................... B65d 63/00
[58] Field of Search ................. 24/274 R, 275, 276, 24/277, 281, 282, 283

[56] References Cited
UNITED STATES PATENTS
3,605,213    9/1971    Turner .............................. 24/274 R
2,910,758    11/1959    Arthur ............................. 24/274 R Primary Examiner—James T. McCall
Attorney—Barlow & Barlow

[57] ABSTRACT

A band clip includes a rotatably mounted screw which meshes wormwise with a threaded portion of the band. The screw is provided with a frusto-conical portion and the mounting for the screw presents an inclined surface which co-operates with the frusto-conical portion in such a way that, when the band is in an operative condition, co-action between the frusto-conical portion and the inclined surface biases the screw into engagement with the threaded portion of the band.

9 Claims, 5 Drawing Figures

PATENTED SEP 11 1973

INVENTOR
DAVID LILLEY TURNER
BY
Parlow & Parlow
ATTORNEYS

HOSE CLIPS

BACKGROUND OF THE INVENTION

1. Field of the Invention

This invention relates to band clips of the kind in which, when the band is in an operative condition with the ends thereof arranged in overlapping relation, one end portion of the band is threadably engaged by a screw which is rotatably mounted in a mounting associated with the other end portion of the band, rotation of the screw is in one sense serving to tighten the band and rotation of the screw in the other sense serving to slacken the band. Such clips are hereinafter referred to as band clips of the kind specified.

2. Description of the Prior Art

In band clips of this kind, it has been the general practice heretofore to mount the screw in a substantially cylindrical housing secured to said other end portion of the band and the housing has had a planar end face, which has been normal to the axis of the screw and against which one end of the screw abuts. Usually when the screw has been rotated so as to tighten the band clip, the screw has tended to tilt out of engagement with the band and accordingly the length of the housing for the screw has been substantially equal to the length of the screw in order to prevent the screw from tilting out of engagement with the band.

The rigidity and length of the housing has given rise to problems when such a band clip has been used on a fitting whose diameter varies from that for which the clip was specifically designed.

An object of the present invention is to provide an improved form of band clip of the kind specified.

SUMMARY OF THE INVENTION

According to the present invention we provide a band clip of the kind specified in which the mounting for the screw includes a wall presenting a surface inclined to the axis of the screw, when the screw is in operative engagement with said one end portion of the band, for engagement with co-operating face of the screw in such a way that co-action between said face and said surface, when the band is in the operative condition, results in biasing of the screw towards said one end portion of the band.

Preferably the screw is provided with a frusto-conical portion at one end thereof which portion affords said face of the screw.

Conveniently the generatrix of the frusto-conical portion of the screw may be a straight line but, alternatively the generatrix may be a curve.

The mounting may be formed separately from the band in which case the mounting is constituted by a U-shaped strip of metal comprising a pair of spaced limbs interconnected by a bight portion, said bight portion constituting said wall presenting said inclined surface and said limbs providing side walls of the mounting, the mounting being secured to said other end portion of the band with the limbs thereof extending laterally of a surface of the band.

Alternatively, the mounting may be formed entirely from the band.

BRIEF DESCRIPTION OF THE DRAWINGS

The invention will now be described by way of example with reference to the accompanying drawings in which.

DESCRIPTION OF PREFERRED EMBODIMENTS

Figure 1:
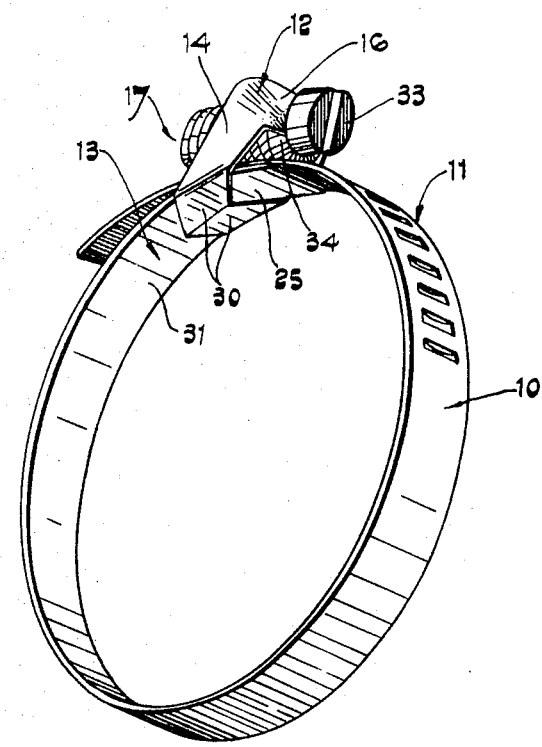
FIG. 1 is a perspective view of one form of band clip according to the invention.
Figure 2:
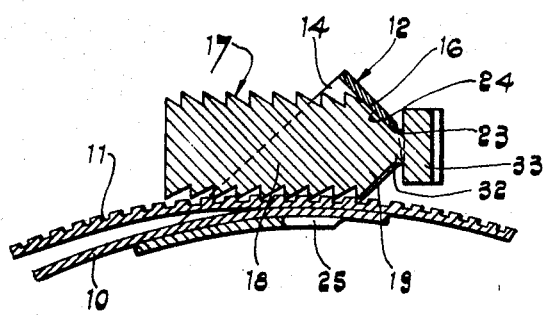
FIG. 2 is an enlarged sectional view of the screw and mounting of the form of band clip shown in FIG. 1, the section being taken in a plane passing through the axis of the screw.

As shown in the embodiment of FIGS. 1 and 2, a band clip according to the invention comprises a band 10 having one end portion 11 thereof formed with transverse screw threads and having a mounting 12 fixedly associated with the other end portion 13 thereof. In this embodiment, the mounting 12 is formed separately from the band and comprises a pair of spaced, parallel side walls 14 and 15 which are interconnected by a transversely extending wall 16.

The mounting 12 is formed from a length of metal strip whose width is smaller than that of the band 10. The strip is initially bent into a U-shape comprising a pair of spaced limbs respectively constituting the side walls 14 and 15 which are interconnected by a bight portion which constitutes the transversely extending wall 16. The free end portions 30 of the limbs of the U-shaped strip are bent towards each other and the mounting so formed is attached to the end portion 13 with the side walls 14 and 15 extending laterally of the band and with the end portions 30 secured by, for example, spot-welding or rivetting in underlying relationship with the inner surface 31 of the end portion 13.

The walls 14, 15 and 16 of the mounting 12 together with the end portion 13 define an opening 25 through which the end portion 11 of the band can be inserted. In this embodiment, the screw 17 comprises a threaded shank 18 at one end of which there is formed a frusto-conical portion 19, the generatrix of which is a straight line. Beyond the portion 19 the screw is provided with a neck portion 32 which terminates in a slotted head 33. An open-ended slot 23 is formed in the wall 16, the open end of the slot being directed towards the band 10 and being flanked on each side thereof by an ear 34, one only of which can be seen in FIG. 1. The neck portion 32 of the screw 17 is located within the slot 23 with the head 33 serving to hold the screw 17 captive within its mounting 12 and the ears 34 are deformed to conform with the frusto-conical portion 19 of the screw 17.

By attaching the mounting 12 to the band 10 with the side walls 14 and 15 extending laterally of the band, the wall 16, and hence an inner face 24 thereof, is inclined to the axis of the screw when the screw is in operative engagement with the end portion 11, as shown in FIG. 1. The relative dimensions of the slot 23 and neck 32 are such as to permit tilting of the screw 17 away from the threaded end portion 11 of the band so that, in operation, the threaded portion 11 can be inserted through the opening 25 and passed beneath the screw 17 with a ratchet effect. Thus, when the band clip is to be tightened around an object, the initial contraction thereof can be effected quickly.

When the band clip has been initially contracted and the screw 17 is subsequently rotated in a suitable sense, worm-wise engagement of the screw 17 with the threaded portion 11 results in tightening of the band 10. The tension of the band arising from tightening thereof is transmitted to the screw 17 through the intermeshing threads of the screw 17 and the portion 11 and an axial force is exerted on the screw 17 from the point of contact between the threads causing the frusto-conical portion 19 of the screw 17 to engage with the inclined face 24 of the wall 16. The reaction of the wall 16 produces a force acting on the screw at approximately 90° to the conical surface thereof thus forcing the screw 17 into more positive engagement with the threaded portion 11 of the band.

The force exerted by the screw 17 on the band 10 produces a reaction force acting from the point of contact between the screw and the threaded portion 11 which reaction force causes the screw 17 to move into closer engagement with the inclined face 24 until the force acting from the point of contact between the wall 16 and the screw 17 and the force acting from the point of contact between the screw 17 and the threaded portion 11 are co-linear. When these forces are co-linear, the screw 17 is in equilibrium.

As the resultant force exerted by the inclined face 24 on the screw 17 will be approximately normal to the surface of the frusto-conical portion 19, the angle of the frusto-cone should be chosen so that the normal from the point of contact between the face 24 and the screw 17 passes through a point on the screw at which deepest engagement is required between the screw 17 and the threaded portion 11.

In a modification to the embodiment of FIGS. 1 and 2, the neck portion 32 can be of increased axial extent to facilitate tilting of the screw 17 away from the portion 11, when the tension in the band is relieved, so that rapid release of the band 10 can be effected. Also, the open-ended slot 23 can be replaced by a through-aperture in the wall 16.

In a further modification to the embodiment of FIGS. 1 and 2, the end portion 13 can be slit longitudinally to form two tongues, the tongues being subsequently deformed to define two spaced, parallel side walls. In this embodiment, the mounting 12 is secured to the side walls so formed and is arranged with the end portions 30 thereof spanning the said side walls and providing a guide for the threaded portion 11 of the band.

Figure 3:
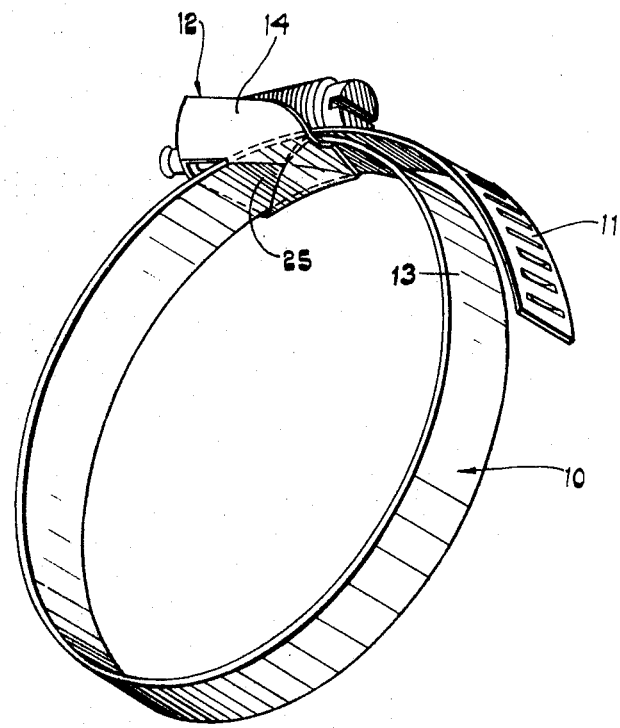
FIG. 3 is a perspective view of another form of band clip according to the invention.
Figure 4:
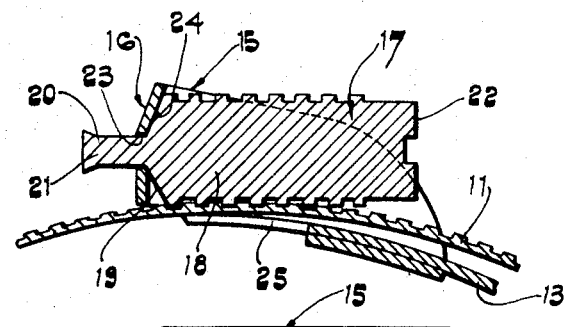
FIG. 4 is a sectional view of the screw and mounting of the form of band clip shown in FIG. 3, the view being taken in a plane passing through the axis of the screw and being to a larger scale than in FIG. 3, and, FIG. 5 is a plan view of the screw and mounting of the band clip shown in FIG. 3.
Figure 5:
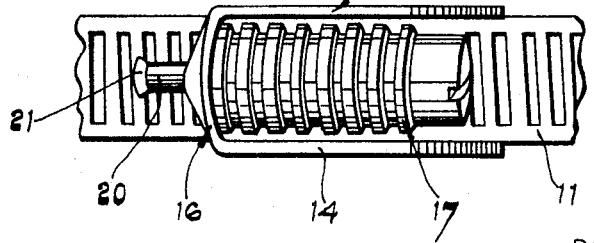

In the form of band clip shown in FIGS. 3 to 5, like reference numerals are used to refer to like parts shown in FIGS. 1 and 2. As shown, one end portion 11 of the band 10 has a transverse screw thread formed thereon, the thread running from said one end of the band and extending over approximately one-third of the length of the band. A mounting 12 is fixedly associated with the other end portion 13 of the band, said mounting comprising a pair of spaced, parallel side walls 14 and 15 which are interconnected by a wall 16 which extends transversely of the axis of the band. The mounting 12 is formed entirely from the band and is formed so that the lower edges of the walls 14, 15 and 16 define an opening 25 through which the threaded end portion 11 of the band can be inserted in the manner illustrated in FIG. 3.

The mounting 12 accommodates a screw 17, the threaded shank 18 of which meshes with the screw thread formed on the portion 11 of the band. A frusto-conical portion 19 is provided at one end of shank 18 of the screw 17, the generatrix of the frusto-conical portion being a straight line. A spigot 20 extends axially from the smaller diameter end of the portion 19 and is formed with an enlarged head 21. A slotted head 22 is provided at the other end of the screw 17 for co-operation with a screwdriver.

The wall 16 of the mounting 12 has an aperture 23 formed centrally therein through which the spigot 20 of the screw 17 extends, the enlarged head 21 of the spigot 20 serving to hold the screw captive within the mounting 12. As is clearly shown in FIGS. 4 and 5, the wall 16 is deformed so that an inner face 24 thereof is inclined to the axis of the screw 17 and conforms with the frusto-conical portion 19. The aperture 23 can be formed by a plunging operation so that the metal displaced tends to strengthen the wall 16 and the plunging operation can be executed in such a way that the wall 16 is deformed so that the inner face 24 thereof is inclined to the required extent. In the embodiment shown in FIGS. 3 to 5, the inner face 24 is rounded in plan view and has a generally conical configuration as viewed in side elevation.

As in the embodiment of FIGS. 1 and 2, the frusto-conical portion 19 can co-act with the inclined face 24 of the mounting 12 and the reaction force exerted on the screw 17 by the wall 16 will be directed towards the threaded portion 11 of the band 10, when the band 10 is under tension. Thus, as in the previous illustrated embodiment, the screw 17 engages more positively with the threaded portion 11 of the band as the band is tightened by rotating the screw 17 in a suitable sense.

In a modification to the embodiment of FIGS. 3 to 5, the aperture 23 can be replaced by an open-ended slot as in the embodiment of FIGS. 1 and 2.

In both of the illustrated embodiments of the invention, the inner face 24 of the wall 16 is of generally conical configuration. In an unshown embodiment, the wall 16 of the mounting 12 can present a dish-shaped surface in which case the generatrix of the frusto-conical portion 19 of the screw 17 will be a curve, the arrangement being such that, when the band 10 is under tension, the reaction force arising through engagement of the frusto-conical portion 19 with the dish-shaped face is directed towards the band 10 to urge the screw into positive engagement with the threaded portion 11.

In all of the embodiments described above, the band can be slackened by rotating the screw in a suitable sense. Conveniently, however, the screw 17 is mounted within the mounting 12 in such a way that the screw 17 can be tilted away from the threaded portion 11 so as to enable the threaded portion 11 to undergo sliding movement relative to the portion 13 of the band. In this way rapid release of the band can be effected.

In order to obtain good interengagement between the intermeshing threads of the end portion 11 and the screw 17 it is desirable that the trailing face of thread on the screw should be substantially perpendicular to the axis of the screw. When this condition is fulfilled positive biasing of the screw towards the end portion 11 is obtained.

I claim:

1. In a band clip of the kind which includes a screw rotatably mounted, for threaded engagement with one end portion of the band, in a mounting fixedly associated with the other end portion of the band, the improvement wherein:
   a. the mounting includes a wall which presents a surface for engagement with the screw, said surface being inclined to the axis of the screw,
   b. the screw includes a face co-operating with said inclined surface, co-action between said inclined surface and said face of the screw, when the band is in an operative condition with the end portions thereof in overlapping relation, resulting in biasing of the screw towards said one end portion of the band, and
   c. the screw and the mounting having co-operating means which retain the screw in the mounting and enable tilting of the screw out of said threaded engagement with said one end portion so that relative sliding movement between the end portions of the band can take place.

2. A band clip according to claim 1 in which the screw is provided with a frusto-conical portion at one end thereof, which portion affords said face of the screw, the generatrix of the frustro-conical portion of the screw being a straight line.

3. A band clip according to claim 2 in which a spigot projects from the smaller diameter end of the frusto-conical portion of the screw and is received in an opening in the wall presenting said inclined surface.

4. A band clip according to claim 1 in which the screw is provided with a frusto-conical portion at one end thereof, which portion affords said face of the screw, the generatrix of the frusto-conical portion of the screw being a curve.

5. A band clip according to claim 4 in which a spigot projects from the smaller diameter end of the frusto-conical portion of the screw and is received in an opening in the wall presenting said inclined surface.

6. A band clip as claimed in claim 1 in which the mounting is formed integrally from the band and includes a pair of spaced, parallel side walls interconnected by said wall presenting said inclined surface.

7. A band clip according to claim 1 in which the mounting is constituted by a U-shaped strip of metal comprising a pair of spaced limbs interconnected by a bight portion, said bight portion constituting said wall presenting said inclined surface and said limbs providing side walls of the mounting, the mounting being secured to said other end portion of the band with the limbs thereof extending laterally of a surface of the band.

8. A band clip according to claim 7 in which the free ends of said limbs straddle said one end portion of the band and are secured in underlying relationship with a further surface of the band.

9. A band clip according to claim 1 in which said co-operating means comprises an opening in the wall presenting said inclined surface and a projection extending axially from said co-operating face of the screw and through said opening.

* * * * *